(12) United States Patent
Hertzler et al.

(10) Patent No.: US 8,080,226 B2
(45) Date of Patent: Dec. 20, 2011

(54) METHODS AND SYTEMS FOR THE DESTRUCTION OF PERFLUORINATED COMPOUNDS

(75) Inventors: Christopher Hertzler, San Jose, CA (US); Vivian W. Hui, San Jose, CA (US)

(73) Assignee: TecHarmonic, Inc., San Jose, CA (US)

( * ) Notice: Subject to any disclaimer, the term of this patent is extended or adjusted under 35 U.S.C. 154(b) by 1048 days.

(21) Appl. No.: 11/805,766

(22) Filed: May 23, 2007

(65) Prior Publication Data

US 2007/0274888 A1    Nov. 29, 2007

Related U.S. Application Data

(60) Provisional application No. 60/808,321, filed on May 24, 2006.

(51) Int. Cl.
*B01D 53/14* (2006.01)
*B01D 53/70* (2006.01)

(52) U.S. Cl. ......... 423/240 R; 95/199; 95/211; 95/233; 95/237; 96/234; 96/290; 422/168; 422/169; 422/177; 423/245.1; 423/245.3

(58) Field of Classification Search ............... 95/223, 95/199, 233, 237, 211; 422/168, 169, 177; 423/240 R, 245.1, 245.3; 96/234, 290

See application file for complete search history.

(56) References Cited

U.S. PATENT DOCUMENTS

| | | | |
|---|---|---|---|
| 6,849,573 B2 * | 2/2005 | Haga et al. | 502/329 |
| 2003/0049182 A1 * | 3/2003 | Hertzler et al. | 422/168 |

\* cited by examiner

*Primary Examiner* — Duane Smith
(74) *Attorney, Agent, or Firm* — Carr & Ferrell LLP

(57) ABSTRACT

Methods and systems for the destruction of one or more PFCs in a gas stream are provided. The gas stream can come from semiconductor processing, for example. The PFCs in the gas stream are reacted with steam in the presence of a catalyst to fragment the PFCs into other compounds that are readily removed from the gas stream. The catalyst comprises gallium, and can additionally comprise zirconium oxide. The gas stream can also be pre-treated prior to reacting the PFCs with steam to remove substances that could be deleterious to the catalyst.

29 Claims, 3 Drawing Sheets

METHODS AND SYTEMS FOR THE DESTRUCTION OF PERFLUORINATED COMPOUNDS

CROSS-REFERENCE TO RELATED APPLICATIONS

This application claims the benefit of U.S. Provisional Patent Application No. 60/808,321 filed on May 24, 2006 and entitled "Development and Testing of a Robust Method for Destruction of Perfluorinated Compounds in Semiconductor Manufacturing" which is incorporated herein by reference.

BACKGROUND OF THE INVENTION

1. Field of the Invention

The present invention relates generally to the field of semiconductor manufacturing and more particularly to methods for removing perfluorinated compounds from waste gases produced by semiconductor manufacturing processes.

2. Description of the Prior Art

Perfluorinated compounds (PFCs) comprise a class of molecules characterized by one or more carbon atoms with one or more fluorine atoms that may additionally include atoms of hydrogen and/or oxygen. PFCs are typically gases under ordinary conditions. Exemplary PFC gases include $CF_4$, $C_2F_5H$, $C_2F_2H_4$, $CF_3H$, $C_2F_6$, $C_3F_8$, $C_4F_8$, and $C_4F_8O$. PFCs have been found to be damaging to the environment and are recognized as a contributing factor to greenhouse warming. Unfortunately, many manufacturing processes, and particularly semiconductor manufacturing processes, rely on various PFCs and adequate replacements have not been identified, so preventing these PFCs from entering the atmosphere has become a manufacturing imperative.

Abating PFCs, however, is very difficult in that they do not readily absorb, burn, or adsorb. Nevertheless, one existing method burns PFCs with a very high temperature methane flame. This method has several drawbacks, however. First, achieving the required temperature consumes a large flow of methane and pure oxygen. This is both expensive and produces a large quantity of carbon dioxide, another greenhouse gas. In addition, this method is not very effective for removing certain PFCs such as carbon tetrafluoride, commonly used in semiconductor manufacturing.

Another method for PFC abatement routes the PFCs through a plasma device. One problem is that maintaining a plasma requires sophisticated technicians. Another is that the devices are prone to fail, especially where the flow vacillates or where there is heavy fouling in the discharge stream.

A third method for abating PFCs employs a catalyst to catalyze a decomposition reaction. There are a number of challenges in developing a robust and sustainable catalytic abatement system, however. One challenge is that the catalyst must be effective in promoting the decomposition of PFCs that are very stable and typically not very reactive. Second, the system must protect the catalyst from poisoning and fouling from other compounds in the stream such as acids, halogen gases, and particulates. Finally, the catalyst, and the substrate that supports the catalyst, must be capable of withstanding very high temperatures required to activate the decomposition reaction and must also be resistant to the acid gases formed by the PFC decomposition.

Consequently, there is a need for methods that effectively and economically treat the discharges from semiconductor manufacturing lines to prevent the release of PFCs and that comply with international treaties on greenhouse gases.

SUMMARY

An exemplary method for removing a perfluorinated compound from a gas stream comprises reacting the perfluorinated compound with steam in the presence of a catalyst comprising gallium in the form of, for example, gallium oxide. In some alternative embodiments, the catalyst further includes zirconium oxide. An alternative method may also comprise passing the gas stream through a particulate scrubber, and/or passing the gas stream and a flow of water through a packed column before reacting the perfluorinated compound with steam, passing the gas stream through a dry air reactor.

Another exemplary method for removing a perfluorinated compound from a gas stream comprises pre-treating the gas stream and reacting the perfluorinated compound with steam in the presence of a catalyst that includes gallium. Pre-treating the gas stream includes passing the gas stream through a first particulate scrubber, and passing the gas stream through a first packed column. An alternative method further comprises passing the gas stream through a second particulate scrubber and/or passing the gas stream through a second packed column after reacting the perfluorinated compound with steam.

An exemplary system for removing a perfluorinated compound from a gas stream comprises a reactor vessel and a first packed column. The reactor vessel includes a catalyst bed comprising a catalyst material including gallium disposed on an alumina substrate. The first packed column is in fluid communication with an outlet of the reactor vessel and is configured to receive a flow of water therethrough. In some embodiments, a concentration of gallium within the catalyst material is in a range of about 20% to about 40% by weight, and in further embodiments the concentration of the gallium within the catalyst material is in a range of about 27% to about 32% by weight. The catalyst material may alternatively further include zirconium oxide, and in some embodiments a concentration of the zirconium oxide within the catalyst material is in a range of about 2% to about 10% by weight. In further embodiments, the concentration of the zirconium oxide within the catalyst material is in a range of about 5% to about 7% by weight.

Another exemplary system for removing a perfluorinated compound from a gas stream comprises a dry air reactor, a first packed column configured to receive a first flow of water therethrough, and a first particulate scrubber between and in fluid communication with the dry air reactor and the first packed column and configured to receive a second flow of water therethrough. The system also comprises a reactor vessel including an inlet in fluid communication with the first packed column, an outlet, and a catalyst bed comprising a catalyst material including gallium disposed on an alumina substrate. The system further comprises a second packed column configured to receive a third flow of water therethrough, and a second particulate scrubber in fluid communication between the outlet of the reactor vessel and the second packed column. The second particulate scrubber is configured to receive a fourth flow of water therethrough. In some embodiments, the system may also comprise a sump, where the first and second particulate scrubbers and the first and second packed columns are each configured to drain into the sump. The sump may, in some instances, provide the fluid communication between the first particulate scrubber and the first packed column, and between the second particulate scrubber and the second packed column. The system may also comprise a recirculation system configured to recirculate water from the sump to the first and second particulate scrubbers and the first and second packed columns.

Another method is directed to removing a perfluorinated compound from a gas stream where the gas stream also includes carbon monoxide. This method comprises reacting the carbon monoxide with steam in the presence of a catalyst comprising gallium to produce hydrogen. The method further comprises reacting the perfluorinated compound with steam and the hydrogen in the presence of the catalyst.

DETAILED DESCRIPTION OF THE INVENTION

The present invention provides systems and methods for the destruction of PFCs in a gas stream. Such gas streams can comprise waste gases from semiconductor processing or other manufacturing processes that generates PFCs as a waste product. In various embodiments, the PFCs in the gas stream are reacted with steam in the presence of a catalyst to fragment the PFCs into other compounds that are readily removed from the gas stream. The catalyst allows the reaction of the PFCs with the steam to occur at a reasonable temperature such that maintaining the reaction does not require an undue amount of energy. The present invention also provides systems for implementing the methods described herein. The various systems include a catalytic reactor and can also include upstream and downstream devices on either side of the catalytic reactor. The upstream devices serve to prevent fouling of the catalyst, while the downstream devices are provided to remove the PFC decomposition products from the gas stream.

Figure 1:
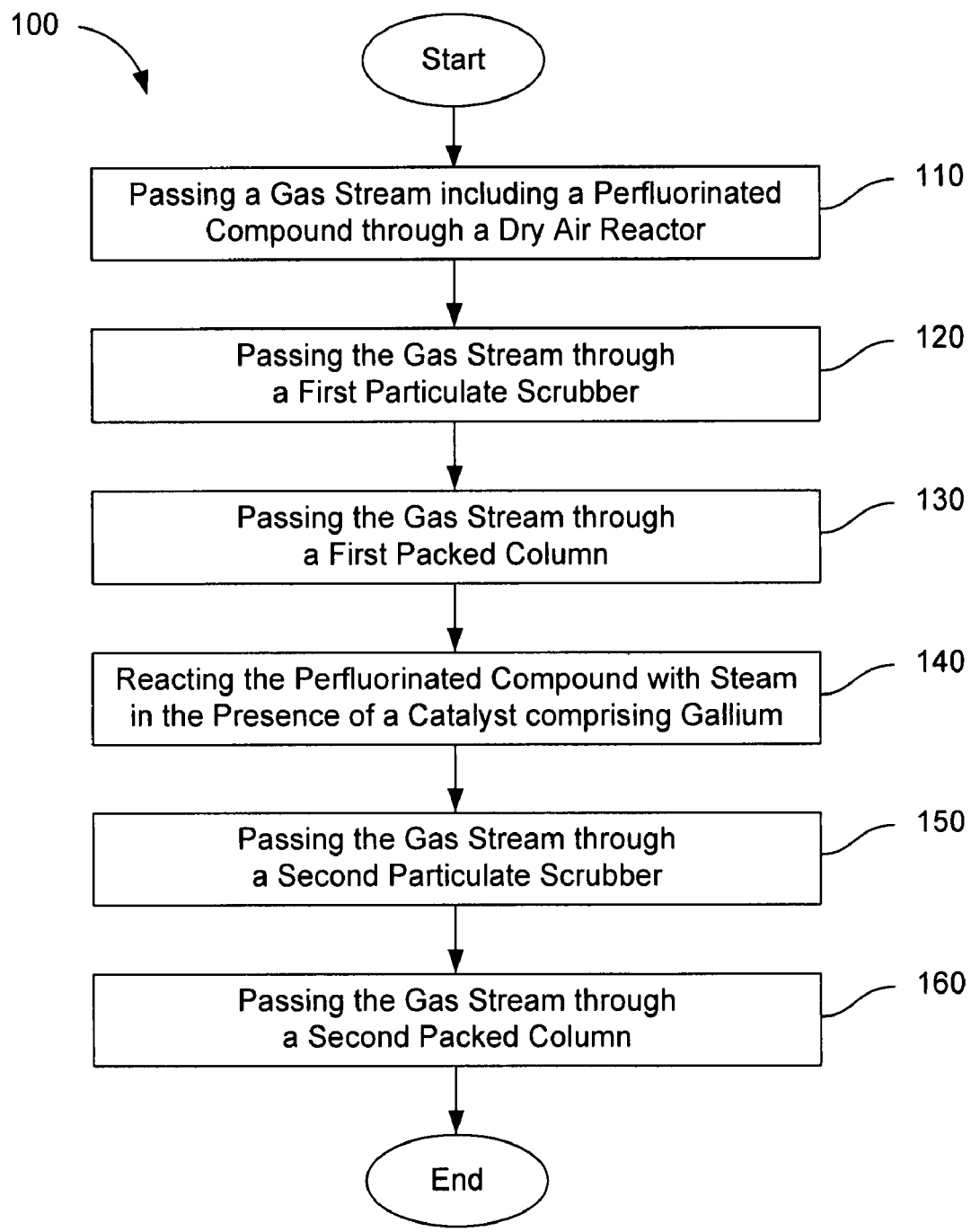
FIG. 1 is a flowchart representation of a method for removing a perfluorinated compound from a gas stream, according to an exemplary embodiment of the invention.
Figure 2:
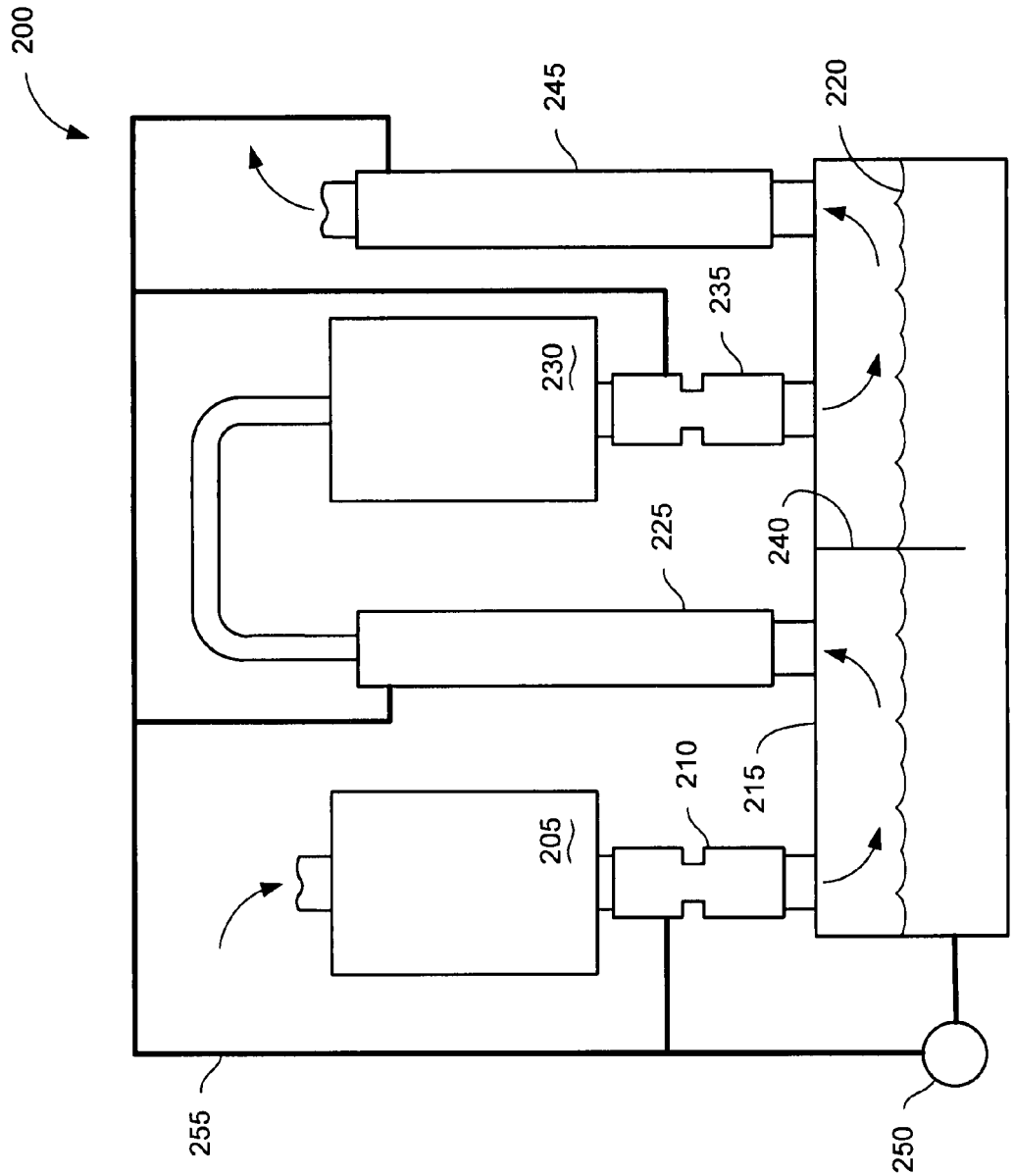
FIG. 2 is a schematic representation of a system for removing a perfluorinated compound from a gas stream, according to an exemplary embodiment of the invention.

FIGS. 1 and 2 show, respectively, an exemplary method 100 and an exemplary system 200 for destroying PFCs in a gas stream. Examples of PFCs that can be removed by the method and the system 200 include $CF_4$, $C_2F_5H$, $C_2F_2H_4$, $CF_3H$, $C_2F_6$, $C_3F_8$, $C_4F_8$, and $C_4F_8O$. Arrows in FIG. 2 indicate the over-all flow of a gas stream through the system 200.

The method 100 begins at step 110 by passing a gas stream that includes a perfluorinated compound through a dry air reactor. An exemplary dry air reactor is a plug flow reactor 205 shown in FIG. 2. When operated at a sufficiently high temperature, the dry air reactor is effective to combust any pyrophoric or flammable gases within the gas stream. A suitable temperature range for the operation of the dry air reactor is about 1050° C. to about 1200° C., and 1150° C. works well.

The method 100 further comprises a step 120 of passing the gas stream through a first particulate scrubber. An exemplary particulate scrubber 210 is shown in FIG. 2. Suitable particulate scrubbers are described in U.S. patent application Ser. No. 09/274,325 filed on Oct. 17, 2002 and titled "System and Method for Abatement of Dangerous Substances from a Waste Gas Stream," now abandoned, which is incorporated herein by reference. The particulate scrubber 210 employs a water vortex to flush particles from the gas stream that could foul the catalytic bed that is described below. Water from the particulate scrubber 210 is recovered in a sump 215, discussed further below.

The particulate scrubber 210 also serves to cool the gas stream. By cooling the gas stream below the condensation temperature of a gaseous compound within the gas stream, that compound can be made to precipitate out of the gas stream, as is well known in the art. Accordingly, by cooling the gas stream in the particulate scrubber 210, various compounds can be precipitated for removal from the gas stream, serving to further protect the catalyst bed from fouling.

The gas stream flows from the particulate scrubber 210 into the sump 215. The sump 215 is maintained such that a water level 220 within the sump 215 leaves an air space within which the gas stream can flow to a first packed column 225. In a step 130, the gas stream is passed through a first packed column such as the first packed column 225. The first packed column 225 can comprise, for example, a vertical column of a packed media through which water flows downward while the gas stream flows upward. The step 130 of passing the gas stream through a first packed column can be effective to remove corrosive gases from the gas stream. Water from the first packed column 225 is also recovered in the sump 215.

It will be appreciated that collectively, the steps 110-130 of passing the gas stream through the dry air reactor, passing the gas stream through a first particulate scrubber, and passing the gas stream through a first packed column, constitute a pre-treatment of the gas stream. The pre-treatment, as noted above, serves to remove constituents of the gas stream that could be deleterious to the subsequent catalyst bed. Depending on the particular constituents of the gas stream, all or part of the pre-treatment can be omitted. For example, the step of passing the gas stream through the dry air reactor may be omitted where the gas stream does not include pyrophoric or flammable gases. Likewise, the step 120 of passing the gas stream through the particulate scrubber may be omitted where the gas stream does not include particulates or compounds that can be precipitated, and the step 130 of passing the gas stream through the first packed column may be omitted where the gas stream does not include corrosive gases.

In a step 140, the PFCs within the gas stream are next reacted with steam in the presence of a catalyst comprising gallium. An exemplary catalytic reactor for the step 140 of reacting the PFCs with steam is catalytic reactor 230 shown in FIG. 2, and discussed in more detail with reference to FIG. 3. The catalytic reactor 230 fragments the PFCs into other compounds that can be readily removed from the gas stream. Exemplary reaction products from the decomposition of PFCs include carbonyl fluoride, carbon dioxide, hydrogen fluoride, and molecular fluorine. The catalytic reactor 230 can also catalyze a reaction of sulfur hexafluoride and water to oxides of sulfur, hydrogen fluoride, and fluorine. While sulfur hexafluoride is not a PFC, it is a common waste product of many semiconductor processes that is not easily abated.

The catalyst in the catalytic reactor 230 is also preferably effective to catalyze a reaction between water and carbon monoxide, when present in the gas stream, to form hydrogen and carbon dioxide. This reaction is commonly known in the art as the water shift reaction. The additional hydrogen can then react with the PFCs in the gas stream, or decomposition products thereof, to improve the overall efficiency of PFC destruction within the catalytic reactor 230.

After reacting the PFC with steam in step 140, the method 100 comprises the step 150 of passing the gas stream through a second particulate scrubber such as particulate scrubber 235. In some embodiments, particulate scrubber 235 is the same type of scrubber as particulate scrubber 210. Here, the step 150 of passing the gas stream through the second particulate scrubber serves principally to cool the gas stream. Water from the particulate scrubber 235 is also recovered in the sump 215.

In the system 200, the gas stream is vented from the particulate scrubber 235 back into the sump 215. As noted above, the sump 215 is maintained such that the water level 220 within the sump 215 leaves an air space. A partition 240 separates the air space within the sump 215 into two air chambers such that the first air chamber provides fluid communication between the particulate scrubber 210 and the first packed column 225, while the second air chamber provides fluid communication between the particulate scrubber 235 and a packed column 245. The water level 220 is maintained, for example, by sensors within the sump 215, pumps, and valves, that prevent the water level 220 from dropping below the bottom of the partition 240 and that prevent the water level 220 from rising too close to the top of the sump 215. Accordingly, water can be added to the sump 215 if the water level 220 drops too low, or withdrawn if the water level 220 rises too high.

The method 100 further comprises, in a step 160, passing the gas stream through a second packed column such as the packed column 245. In some embodiments, packed column 245 is the same type of packed column as packed column 225. Water from the second packed column 245 is also recovered in the sump 215. In system 200, the packed column 245 is effective to remove compounds such as carbonyl fluoride, hydrogen fluoride, and molecular fluorine. The gas stream that emerges from the packed column 245 is essentially free of PFCs and the decomposition products thereof.

As noted above, particulate scrubbers 210, 235 and packed columns 225, 245 employ water that drains into the sump 215. In the embodiment shown in FIG. 2, a recirculation system comprises pump 250 and a water distribution system 255 to provide water from the sump 215 back to those components that employ water.

Figure 3:
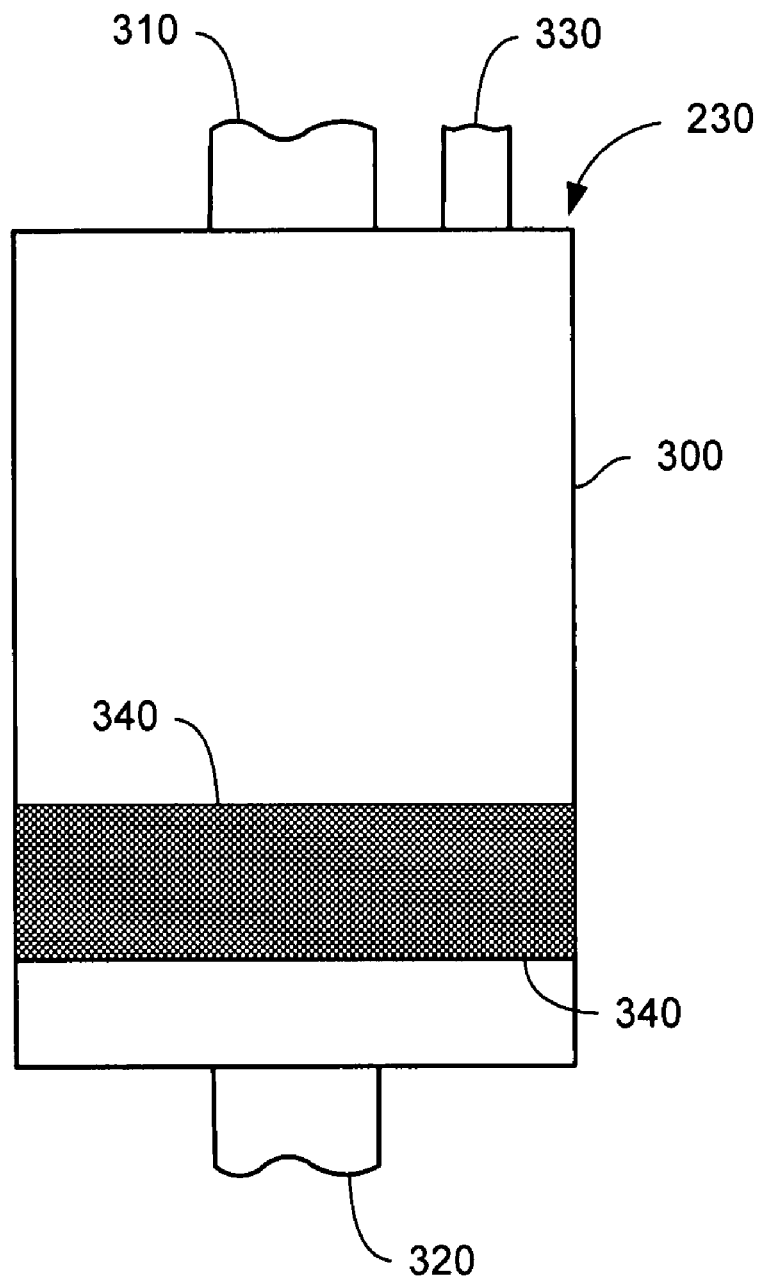
FIG. 3 is a schematic representation of a catalytic reactor, according to an exemplary embodiment of the invention

FIG. 3 describes the catalytic reactor 230 in greater detail. The catalytic reactor 230 comprises a reactor vessel 300 having a gas stream inlet 310, a gas stream outlet 320, and a water inlet 330. The reactor vessel 300 includes a catalyst 340 suspended within the reactor vessel 300 on a porous retention plate 350. The catalytic reactor 230 can also comprise a monitoring system (not shown) to monitor the conditions within the reactor vessel 300 such as temperature and pressure. A suitable operating temperature within the reactor vessel 300 is generally above about 900° Kelvin and more particularly from about 1100° Kelvin to about 1250° Kelvin. The operating temperature can be achieved and maintained with heaters (not shown) that heat the catalyst 340 and/or the reactor vessel 300.

The water inlet 330 is used to introduce either steam or liquid water into the reactor vessel 300. Where steam is introduced through the water inlet 330, a steam generator (not shown) can be connected to the water inlet 330. An exemplary steam generator can provide about 3 lbs to about 27 lbs of steam per hour to the catalytic reactor 230. Alternately, liquid water can be injected into the reactor vessel 300 through the water inlet 330 and will rapidly convert to steam.

The catalyst 340, in some embodiments, comprises a catalytic bed of a high surface area substrate having a catalytic material disposed thereon. For example, the substrate can be ceramic beads or pellets such as 3.5 mm diameter alumina spheres. In some embodiments, the ceramic can be alumina doped with zirconium oxide.

The catalytic material includes gallium, which can be present as gallium oxide, metallic gallium, or a mixture of the two. A suitable total concentration of gallium within the catalytic material is generally about 20% to about 40% by weight. The catalytic material can additionally comprise potassium or sodium in the form of a salt such as potassium chloride or sodium chloride. A suitable concentration of potassium within the catalytic material is generally about 5% to about 20% by weight. The catalytic material may further comprise zirconium oxide to provide decreased friability or to increase catalytic performance where the catalyzed reaction includes breaking C—H bonds. A suitable concentration of zirconium oxide within the catalytic material is generally about 2% to about 10% by weight. An exemplary catalytic material typically comprises about 27% to about 32% gallium by weight and about 5% to about 7% zirconium oxide by weight.

The catalytic material can combined with the substrate in a number of ways. In one method, a slurry is prepared that includes a powder of the substrate material and a powder of the catalytic material or its precursor materials. The slurry is then formed into pellets, spheres, or extrusions. The resulting pellets, spheres, or extrusions can be baked or sintered, for example. In another method, the catalytic material is coated onto pre-formed pellets, spheres, or extrusions of the substrate material. Coating can be achieved, for example, by dissolving or suspending the catalytic material or its precursor materials in a liquid such as a solvent, submersing the pellets, spheres, or extrusions of the substrate material in the liquid, and subsequently evaporating off or burning off the liquid. Here, the coated pellets, spheres, or extrusions can be air dried, baked, or sintered, for example.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A system for removing a perfluorinated compound from a gas stream, the system comprising:
 a reactor vessel including a catalyst bed, the catalyst bed comprising a catalytic material including gallium, the gallium disposed on an alumina substrate, the catalytic material catalyzing a reaction when the gas stream is passed into the reactor vessel, wherein the catalyzed reaction fragments the perfluorinated compound from the gas stream into components; and
 a first packed column in fluid communication with an outlet of the reactor vessel and configured to receive a flow of water, wherein the first packed column removes from the gas stream the components fragmented from the perfluorinated compound when the gas stream is passed through the first packed column.

2. The system of claim 1 further comprising a first particulate scrubber disposed in fluid communication between the reactor vessel and the first packed column.

3. The system of claim 1 further comprising a dry air reactor in fluid communication with an inlet of the reactor vessel.

4. The system of claim 3 further comprising a second particulate scrubber in fluid communication between the dry air reactor and inlet of the reactor vessel.

5. The system of claim 4 further comprising a second packed column in fluid communication between the dry air reactor and the inlet of the reactor vessel.

6. The system of claim 5 further comprising a second particulate scrubber in fluid communication between the dry air reactor and the second packed column.

7. The system of claim 1 wherein a concentration of gallium within the catalyst material is in a range of about 20% to about 40% by weight.

8. The system of claim 1 wherein a concentration of the gallium within the catalyst material is in a range of about 27% to about 32% by weight.

9. The system of claim 1 wherein the catalyst material further includes zirconium oxide.

10. The system of claim 9 wherein a concentration of the zirconium oxide within the catalyst material is in a range of about 2% to about 10% by weight.

11. The system of claim 9 wherein a concentration of the zirconium oxide within the catalyst material is in a range of about 5% to about 7% by weight.

12. A system for removing a perfluorinated compound from a gas stream, the system comprising:
   a dry air reactor;
   a first packed column configured to receive a first flow of water therethrough;
   a first particulate scrubber in fluid communication between the dry air reactor and the first packed column and configured to receive a second flow of water therethrough;
   a reactor vessel including
      an inlet in fluid communication with the first packed column,
      an outlet, and
      a catalyst bed comprising a catalytic material including gallium disposed on an alumina substrate;
   a second packed column configured to receive a third flow of water therethrough; and
   a second particulate scrubber in fluid communication between the outlet of the reactor vessel and the second packed column and configured to receive a fourth flow of water therethrough.

13. The system of claim 12 further comprising a sump, wherein the first and second particulate scrubbers and the first and second packed columns are each configured to drain into the sump.

14. The system of claim 12 wherein the sump provides the fluid communication between the first particulate scrubber and the first packed column, and also provides the fluid communication between the second particulate scrubber and the second packed column.

15. The system of claim 12 further comprising a recirculation system configured to recirculate water from the sump to the first and second particulate scrubbers and the first and second packed columns.

16. An apparatus for removing a perfluorinated compound from a gas stream, the apparatus comprising:
   an inlet configured to pass the gas stream into a reactor vessel, wherein the gas stream passed into the reactor vessel is free of corrosive gases;
   a catalytic material for catalyzing a reaction that fragments the perfluorinated compound in the gas stream into components, the catalytic material comprising gallium; and
   an outlet configured to pass the treated gas stream out of the reactor vessel, the treated gas stream including the components fragmented from the perfluorinated compound.

17. The apparatus of claim 16, further comprising a water inlet configured to introduce water into the reactor vessel.

18. The apparatus of claim 17, wherein the introduced water is in the form of steam.

19. The apparatus of claim 16, wherein the gas stream received by the inlet previously passed through a dry air reactor configured to combust any pyrophoric or flammable gases in the gas stream.

20. The apparatus of claim 16, wherein the gas stream received by the inlet previously passed through a particulate scrubber configured to remove any particulates or precipitated compounds in the gas stream.

21. The apparatus of claim 16, wherein the gas stream received by the inlet previously passed through a packed column configured to remove any corrosive gases in the gas stream.

22. The apparatus of claim 16, wherein the treated gas stream passed by the outlet is received by a packed column configured to remove the fragmented components from the treated gas stream.

23. The apparatus of claim 16, wherein the temperature within the reactor vessel is maintained above 900° Kelvin.

24. The apparatus of claim 16, wherein the catalytic material is disposed on a substrate having a high surface area.

25. The apparatus of claim 16, wherein the gas stream includes carbon monoxide.

26. A method for removing a perfluorinated compound from a gas stream, the method comprising:
   passing the gas stream through an inlet into a reactor vessel, wherein the gas stream passed into the reactor vessel is free of corrosive gases, the reactor vessel including a catalyst bed, the catalyst bed comprising a catalytic material including gallium, the gallium disposed on an alumina substrate;
   catalyzing a reaction within the reactor vessel fragmenting the perfluorinated compound in the gas stream into components, the reaction being catalyzed by the catalytic material when the gas stream is passed into the reactor vessel;
   passing the treated gas stream out of the reactor vessel through an outlet, the treated gas stream including the components fragmented from the perfluorinated compound; and
   removing from the gas stream the components fragmented from the perfluorinated compound by passing the gas stream through a first packed column in fluid communication with the outlet and configured to receive a flow of water.

27. The method of claim 26, further comprising introducing water into the reactor vessel, wherein the introduced water is in the form of steam.

28. The method of claim 26, wherein the treated gas is passed from the outlet to a packed column and further comprising removing the fragmented components from the treated gas stream by passing the gas through the packed column.

29. The method of claim 26, further comprising maintaining the temperature within the reactor vessel above 900° Kelvin.

* * * * *